(12) United States Patent
Chen

(10) Patent No.: US 7,472,990 B2
(45) Date of Patent: Jan. 6, 2009

(54) TOOL-FREE GLASSES FRAME AND LEGS ASSEMBLY

(76) Inventor: Joy Chen, No. 24, Lane 420, Sec. 1, Chien Kang Road, Tainan City (TW)

( * ) Notice: Subject to any disclaimer, the term of this patent is extended or adjusted under 35 U.S.C. 154(b) by 301 days.

(21) Appl. No.: 11/538,391

(22) Filed: Oct. 3, 2006

(65) Prior Publication Data

US 2008/0079893 A1  Apr. 3, 2008

(51) Int. Cl.
*G02C 1/02* (2006.01)
(52) U.S. Cl. .......................... 351/110; 351/86
(58) Field of Classification Search ................. 351/110, 351/140, 103, 106, 116, 111, 83, 86, 90, 351/91, 92, 93, 153; 16/228
See application file for complete search history.

(56) References Cited

U.S. PATENT DOCUMENTS 5,398,377 A * 3/1995 Takiyama .................... 16/228
5,847,800 A * 12/1998 Tachibana ................... 351/110
6,254,235 B1 * 7/2001 Hsieh Yeh ................... 351/140
6,394,599 B1 * 5/2002 Blanvillain .................. 351/110
6,523,952 B1 * 2/2003 Krumme ..................... 351/110
6,641,265 B1 * 11/2003 Hou ........................... 351/110

* cited by examiner

Primary Examiner—Hung X Dang
(74) Attorney, Agent, or Firm—Banger Shia

(57) ABSTRACT

An assembly of a glasses frame and two legs provides a tool-free, self-assembly and most secured frame-leg attachment contributed by a three-dimensional frame-leg contact structure, which is created by a mortise-tenon contact plane, as well as a protruding piece embedded therein. The mortise-tenon contact plane is formed by a frame tenon extending from the side of a frame, and flexibly received in a corresponding leg mortise on the upper end of the leg. The frame tenon is further refined into two planes of different sizes to enhance the stability of frame-leg attachment.

2 Claims, 3 Drawing Sheets

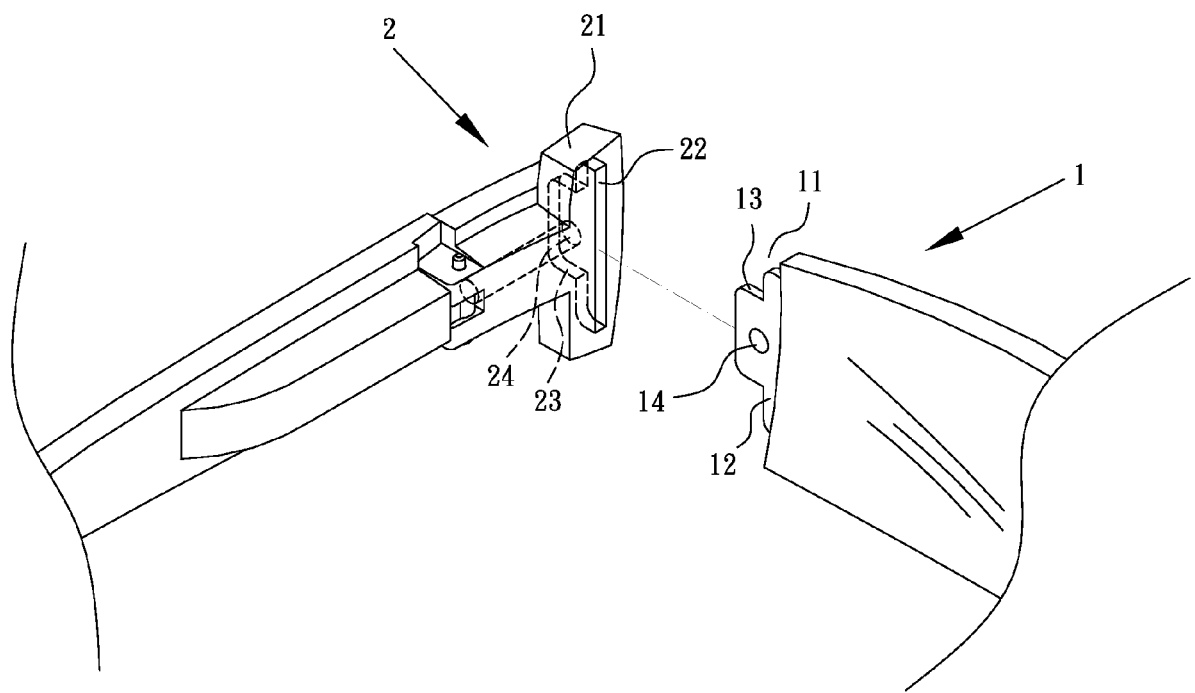
F I G . 1

A - A

B - B

TOOL-FREE GLASSES FRAME AND LEGS ASSEMBLY

BACKGROUND OF THE INVENTION

1. Field of the Invention

The present invention relates to a pair of tool-free self-assembly glasses. In particular, it relates to an assembly of glasses frame and legs with a single-piece appearance, which are easily manufactured, readily assembled, and still possesses substantial stability in its simple structure.

2. Background Art

Conventional glasses include a frame and two legs in addition to the lens. The engagement of a leg to the side of the frame is realized in many different ways. Problems associated with a variety of prior arts can be summarized as two main kinds. The first kind of problems occurs when stability of the frame-leg connection is at its optimal while inconvenience in repairing or replacing a broken piece connecting the frame and a leg is accordingly increased. The second kind of problems is the opposite of the first kind, which occurs when convenience in replacing a broken piece fixing the frame and a leg is at its optimal, while stability of the frame-leg attachment is significantly reduced. Another problem associated with the above two main problems resides in the outer appearance of the glasses, of which the frame-legs connecting piece is expected not to be seen after complete assembly. Some prior arts with the above-stated problems are discussed below in more details.

For most conventional glasses, a frame-leg connecting piece on either side of the frame is used for engaging a leg to the frame. Such a frame-leg connecting piece is often formed by two planes with an angle greater than 90-degree such that one end of the frame-leg connecting piece is welded with one end of a frame, while the other end of the frame-leg piece is screwed in with the glasses leg. As a result, glasses legs can be adjusted to open or fold by moving the leg round the end of its connecting piece into which the leg is screwed.

Since one end of the frame-leg piece is screwed into a glasses leg, screws or bolts, and a screw driver which fits in with the screws or bolts are necessary tools for assembly. Furthermore, welding or soldering techniques applied in fixing the frame-leg connecting piece to the frame is not cost effective in manufacture; as a permanent fixing method, welding or soldering also lacks flexibility in replacement of a broken connecting piece.

To overcome the above-mentioned disadvantages, some conventional glasses are designed for connecting pieces to be readily assembled with the frame. Such an improved design is embodied by forming connection grooves on either side of the frame, and in the mean time, having raised bulbs protruding out on the very upper end of the leg for fixing into the corresponding connection grooves. However, both connection grooves and raised bulbs used for connection purpose are exposed outside after complete assembly, degrading the overall appearance of the glasses.

Some conventional glasses are made with two legs of which each of the upper end is formed with a protruding member of a plurality of teeth for attaching to the embedded groove on either side of the frame. The securing of the legs inside the embedded groove of the frame therefore relies on the protruding teeth only, which covers limited frame-leg contact surface; legs may easily be separated from the frame.

For some other conventional glasses, clasp hooks are used as an alternative frame-leg connecting member. The problem is that it is not an easy job to disassemble a clasp hook connecting member when it comes to replacing a broken hook.

It is therefore the purpose of this invention to provide a cost-effective compact glasses frame and legs assembly, which is easy to be manufactured, tool-free readily assembled, and yet maintains substantial stability, and a single-piece elegant look with the frame-leg connecting piece hidden within its structure.

SUMMARY OF THE INVENTION

The present invention provides a frame-leg structure which distinguishes itself from prior arts by the following features:

(I) The length and width of the frame-leg joint structure are smaller than those of the frame; the former can thus be embedded completely within the latter, giving the glasses a single-piece elegant look.

(II) Three-dimensional contact of a flexible frame-leg joint: For a frame-leg joint, most conventional glasses use screws, bolts, and/or a recess or groove as a receiver, which provide joints made of points (when using screws), or at its best, a planar joint between the frame and legs (when using a recess or groove). In contrast, the present invention employs a 3-D frame-leg contact, which comprises a mortise-tenon plane, and a protruding bulb on top of such a plane; the joint direction of the mortise-tenon plane in the frame-leg contact is perpendicular to that of the protruding bulb. Furthermore, to enhance a even more secured joint of the frame and legs, the mortise-tenon plane is further refined into two planes of different sizes.

(III) The frame tenon for fixing to a leg extends integrally from the frame, saving extra processing (such as electroplating or coating) in manufacture.

(IV) Tool-free self-assembly and trouble-free replacement: The present invention does not require a tool for the assembly of frame and legs. Due to its specific frame and legs structure for making a joint, a broken frame or leg can be readily replaced with bare hands.

To be more specific, a preferred embodiment of the present invention includes a frame, and a leg mortise on each upper end of the legs for joining with the frame. From either side of the frame extends a frame tenon for fitting into the flexible leg mortise on the top of the leg.

The frame tenon is a T-like protruding piece of two-level stairs structure, stretching out from the side of the frame for fitting into a similar T-like recess of the flexible leg mortise. The two-level stairs structure of the frame tenon includes a right stair, which is in direct contact with the frame main body, and a left stair, which faces outwards toward the leg (to which it is to be assembled) and hence sandwiches the right stair in between itself and the frame main body. The length and width of the right stair are both smaller than those of the frame (with which it is joined) so that the right stair can be completely enclosed by its receiver. To create a double planes contact area of different length, the length of the left stair is made smaller than that of its immediate neighbor, the right stair.

Around the center of the frame tenon is embedded a raised bulb for fitting into a corresponding bulb recess in the leg mortise; the insertion direction of the raised bulb into its receiver (i.e. a corresponding bulb recess) is perpendicular to the insertion direction of the frame tenon into its corresponding receiver (i.e. the leg mortise), resulting in a durable frame-leg attachment.

In a similar way, the leg mortise is a flexible T-like two-stairs recess for receiving the frame tenon. The left stair recess of the mortise is housed completely inside the recess, the length and width of which are made to be able to flexibly receive the corresponding left stair of the frame tenon. The right stair recess with longer length faces outwards towards the side of the frame, corresponding to the right stair of the frame tenon. Within the interior of the leg mortise is formed a bulb recess for receiving the corresponding raised bulb.

Having briefly examined the differences between the present invention and the prior arts, we proceed to the description of the invention. The advantages of the present invention over the known prior arts will become more apparent to those of ordinary skilled in the art upon reading the following descriptions in conjunction with the accompanying drawings.

BRIEF DESCRIPTION OF THE DRAWINGS

FIG. 1 is an exploded perspective view of an assembly of a glasses frame and legs in accordance with the present invention.

DETAILED DESCRIPTION OF THE DRAWINGS

Figure 2:
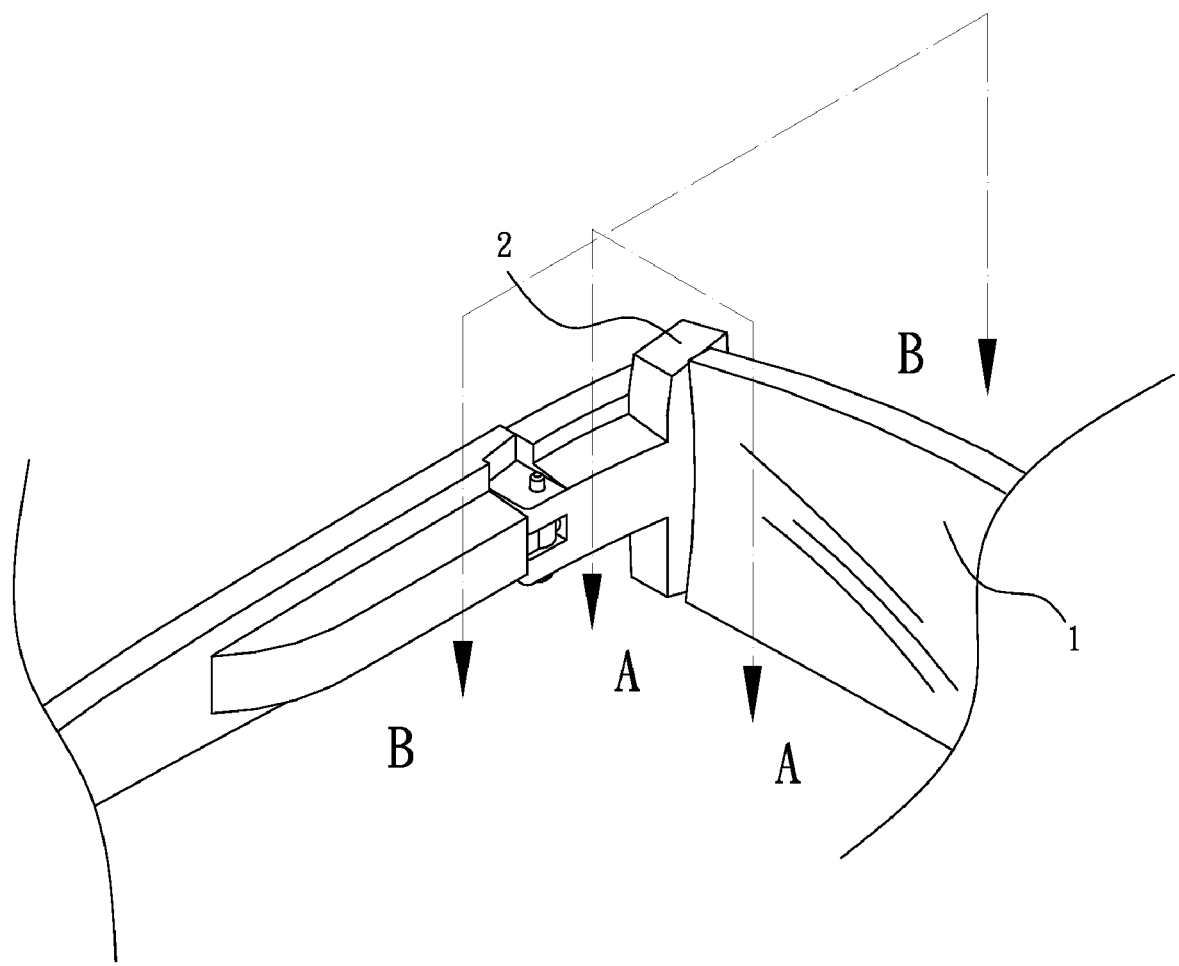
FIG. 2 is a perspective assembly view of an assembly of a glasses frame and legs in accordance with the present invention.

Referring to FIG. 1 to FIG. 4, an assembly of a glasses frame and two legs in accordance with the present invention comprises a frame 1, and a leg mortise 2 on the upper end of each leg for joining with the frame 1 (note that only one leg mortise is shown in FIG. 1 to FIG. 4). On either side of the frame 1 stretches out a frame tenon 11 for fitting into the flexible leg mortise 2. The frame tenon 11 is a T-shaped extension with a two-level stairs structure, including a right stair 12 in direct contact with the frame main body, and a left stair 13, which faces outwards toward the leg mortise 2 (to which it is to be assembled), and hence sandwiches the right stair 12 in between itself (i.e. a left stair 13) and the side of frame 1. The length and width of the right stair 12 are both smaller than those of the frame 1 (with which it is joined) so that the right stair 12 can be completely enclosed by its receiver without exposing outside of the frame 1. The length of the left stair 13 is smaller than that of its immediate neighbor, the right-stair 12, for creating a frame-leg double-plane contact area of different sizes. Around the center of the frame tenon 11 is integrally embedded with a raised bulb 14 for fitting closely into a corresponding bulb recess 24 in the leg mortise 2.

In a similar way, the leg mortise 2 comprises a flexible T-like two-stairs recess 21 comprising a left recess 23, a right recess 22, and a convex recess 24. The left recess 23 is housed completely inside the recess 21 and opens to its immediate neighbor, the right recess 22, which in turn opens outwards toward the frame 1. The size and shape of the left recess 23 and those of the right recess 22 are made to flexibly receive the left stair 13 and the right stair 12 of the frame tenon 11, respectively. As a result, the length of the right recess 22 along the A direction (shown in FIG. 2) is longer than that of the left-recess 23. Inside the interior of the leg mortise 21 is formed a bulb recess 24 for receiving the corresponding raised bulb 14 of the frame tenon 11.

Figure 3:
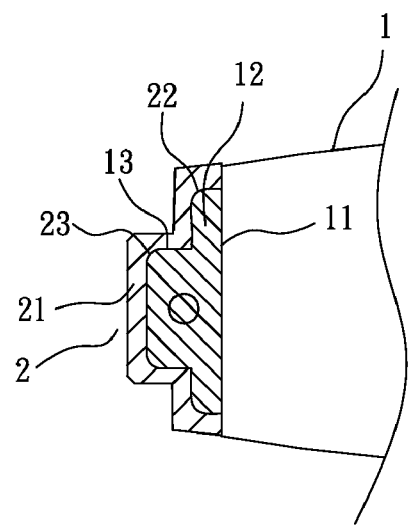
FIG. 3 is a cross-sectional assembly view along the A-A direction of the glasses frame and legs shown in FIG. 2.
Figure 4:
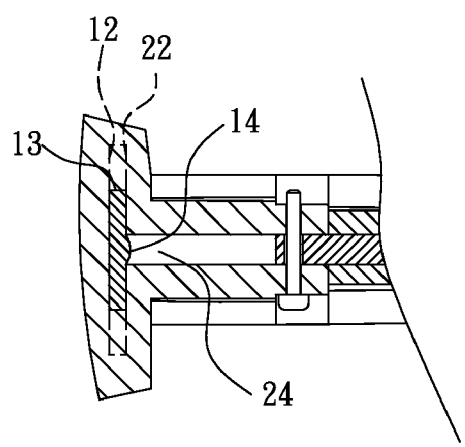
FIG. 4 is a cross-sectional assembly view along the B-B direction of the glasses frame and legs shown in FIG. 2.

Referring to FIG. 2 and FIG. 3, the latter is a cross-sectional view of the former along the A-A dimension. The planar frame-leg contact is achieved by having the leg mortise 2 flexibly receive the frame tenon 11. To be more specific, the right stair 12 is flexibly received in the right recess 22, and the left stair 13 is flexibly received in the left-recess 23, making a double planes contact, and thereby further securing the positioning of the frame tenon 11 inside the leg mortise 2.

Although a preferred embodiment in accordance with the present invention has been provided in this application, it is to be understood that many other possible modifications and variations can be made without departing from the scope of the present invention hereafter claimed.

The invention claimed is:

1. An assembly of a glasses frame and two legs comprising:
   a frame tenon, extending from either of the two sides of a frame, wherein said frame tenon includes:
      a raised piece embedded within said frame tenon;
      a right stair in direct contact with said frame, wherein the length of said right stair is smaller than the length of said frame;
      a left stair facing outwards and joining said right stair, wherein the length of said left stair is smaller than the length of said right stair; and
   a leg mortise, located on the upper end of said leg for flexibly receiving said frame tenon,
   wherein said leg mortise includes:
      a recess body for receiving said raised piece, formed within said leg mortise along the axis of said leg, to which said recess body attaches;
      a left recess housed completely within said leg mortise, wherein the size and shape of said left recess is made to flexibly receive said left stair; and
      a right recess to which said left recess opens, wherein the size and shape of said right recess is made to flexibly receive said right stair.

2. The assembly of a glasses frame and two legs as claimed in claim 1, wherein the width of said frame tenon across the side contacting said frame is smaller that the width of said frame.

* * * * *